C. R. PARKER & R. D. WIRT.
AUTOMOBILE LOCK.
APPLICATION FILED JUNE 30, 1910.
991,014.
Patented May 2, 1911.
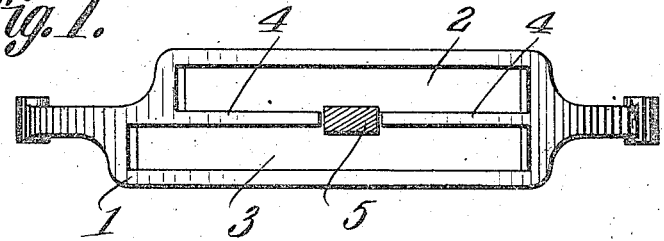
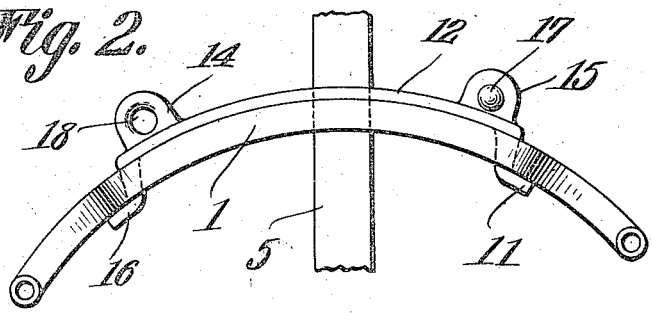
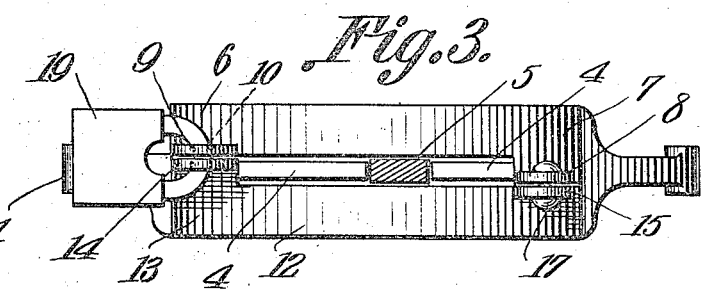
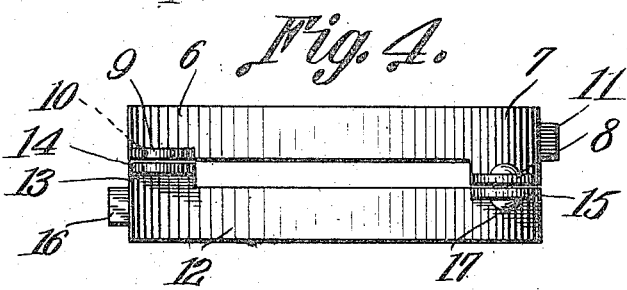
Charles R. Parker
Reuben D. Wirt
Inventors,
Witnesses
by
Attorneys.

UNITED STATES PATENT OFFICE.

CHARLES R. PARKER AND REUBEN D. WIRT, OF PHILADELPHIA, PENNSYLVANIA, ASSIGNORS TO GENERAL UTILITY CO., OF PHILADELPHIA, PENNSYLVANIA.

AUTOMOBILE-LOCK.

991,014.  Specification of Letters Patent.  Patented May 2, 1911.

Application filed June 30, 1910. Serial No. 569,760.

*To all whom it may concern:*

Be it known that we, CHARLES R. PARKER and REUBEN D. WIRT, citizens of the United States, residing at Philadelphia, in the county of Philadelphia, State of Pennsylvania, have invented a new and useful Automobile-Lock, of which the following is a specification.

This invention relates to locks for automobiles and other motor vehicles having controlling levers, one of the objects of the invention being to provide a simple form of lock adapted to be connected to the guide plate of a speed lever or the like and which, when in engagement therewith, will hold the lever in a neutral position.

Another object is to provide a lock of simple construction the parts of which are assembled in a novel manner and are shiftable to engage both the guide plate or other supporting structure and the lever and thus hold the two structures in fixed relation relative to each other.

A still further object is to provide a lock including engaging lugs or the like which are shiftable into locking position by the movement of the lock into engagement with the lever.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a plan view of a lever guide plate, the lever being shown in section in its neutral position, said plate being one of the type with which the present invention may be used. Fig. 2 is a side elevation of the guide plate and a portion of the lever and also the lock in position upon the plate. Fig. 3 is a plan view of the parts shown in Fig. 2, the lever being shown in section, there being a pad lock in engagement with the device constituting the present invention. Fig. 4 is a plan view of the lever lock *per se*.

Referring to the figures by characters of reference 1 designates a guide plate such as found upon various makes of motor vehicles, the plate, in this instance, being arcuate and having two parallel slots 2 and 3 therein separated by spaced longitudinally extending tongues 4. The space between these tongues is adapted to be occupied by the speed lever or the like, such as has been indicated at 5, when said lever is in its neutral position.

The lock constituting the present invention consists of an arcuate plate 6 having a lateral extension 7 at one end, provided, at its terminal, with an upstanding ear 8 parallel with the longitudinal edges of the plate 6. Another ear 9 extends upwardly from the inner side of the plate 6 adjacent the other end thereof, this ear being formed with an opening 10 for the purpose hereinafter set forth. An engaging lug 11 extends from the bottom of the plate 6 adjacent the lateral extension 7 and projects beyond the end of the plate, this lug being preferably shaped so as to project through one of the slots 2 and 3 and under one end wall of the slot. The lock includes another plate 12 which is similar in all respects to the plate 6 it being provided at one end with a lateral extension 13 having an upstanding ear 14 while an ear 15 projects upwardly from the other end portion of the plate and along the inner side thereof. A lug 16 similar to the lug 11 projects from the plate 12 beyond that end thereof carrying the extension 13. The ears 8 and 15 are pivotally connected by a rivet 17 or the like so that the said plates 6 and 12 can swing relative to each other. The ear 14 has an opening 18 therein corresponding with and adapted to register with the opening 10.

In using the lock which has been described, the lever 5 is placed in its neutral position between the tongues 4 and the two plates 6 and 12 are swung apart so as to permit them to be placed at opposite sides of the lever and to swing the lugs 11 and 16 toward each other. Said lugs are then inserted downwardly into the respective slots 2 and 3 and the plates 6 and 12 are moved together so as to cause the lugs to swing under and into engagement with one end wall of one of the slots and the opposite end wall of the other slot. After the plates have thus been positioned, a padlock 19 or the like may be inserted into the registering openings 10 and 18, thus locking the plates against independent movement and preventing them from becoming disengaged from the guide plate 1. With the lock in this position on the guide plate, it becomes impossible to shift the lever 5 laterally and out of its neutral position.

While the lock is particularly designed for use in connection with the speed lever of an automobile, it is to be understood that the same can also be used wherever it is desired to lock a lever in a predetermined position and thus prevent unauthorized persons from shifting the lever.

Various changes can of course be made in the construction and arrangement of the parts without departing from the spirit or sacrificing any of the advantages of the invention as defined in the appended claims.

What is claimed is:—

1. A lock including movably connected lever engaging members mounted for movement in parallel paths relative to each other, projecting means carried thereby for engaging a lever guide, and means for locking the members against relative movement to hold them in engagement with the lever and guide.

2. A lock including movably connected members having their corresponding faces normally flush with each other, said members being independently movable in parallel paths, relatively movable lever guide engaging devices carried thereby, said members being shiftable relative to each other to surround a lever and to move said devices into engagement with the guide, and means for locking the members against relative movement while in engaging position.

3. A lock including movably connected lever engaging members having their corresponding faces normally flush, lever guide engaging devices extending from opposite portions of the respective members, said members being mounted to move in parallel paths relative to each other and means for securing said members against relative movement while in engagement with the lever and guide.

4. A lock including pivotally connected members forming a lever receiving opening therebetween and mounted to move in parallel paths relative to each other, lever guide engaging devices extending from opposite ends of the respective members, and means for engagement with a lock to hold the members against relative movement while engaging a lever and guide.

5. A lock including parallel members coöperating to form a lever receiving opening therebetween, a pivotal connection between the members, fastener receiving means upon the members to hold them against relative movement, a lever guide engaging device extending from one end of one member and a corresponding device extending from the opposite end of the other member.

6. A lock including oppositely disposed similar plates having upstanding portions at their meeting edges, a pivot device extending through one of said portions of each plate, there being apertures within the remaining portions for the reception of a fastening device, said plates coöperating to form a lever receiving opening therebetween, and a structure engaging device extending from one end of each plate, said devices being extended in opposite directions.

7. A lock including oppositely extending support engaging projections, and means movably connected by a single pivot and adapted to travel in parallel planes for shifting said devices simultaneously in opposite directions, said means constituting lever engaging and holding means.

In testimony that we claim the foregoing as our own, we have hereto affixed our signatures in the presence of two witnesses.

CHARLES R. PARKER.
REUBEN D. WIRT.

Witnesses:
CHARLES K. JOHNSON,
ANSON B. EVANS.

---

Copies of this patent may be obtained for five cents each, by addressing the "Commissioner of Patents, Washington, D. C."